Patented June 13, 1933

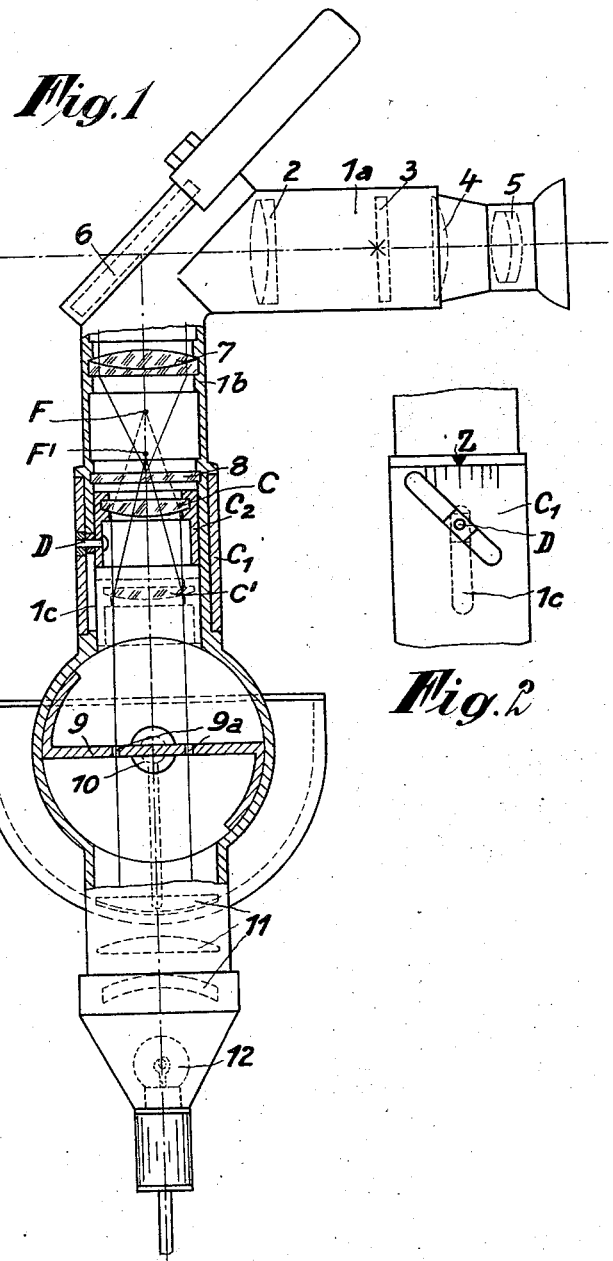

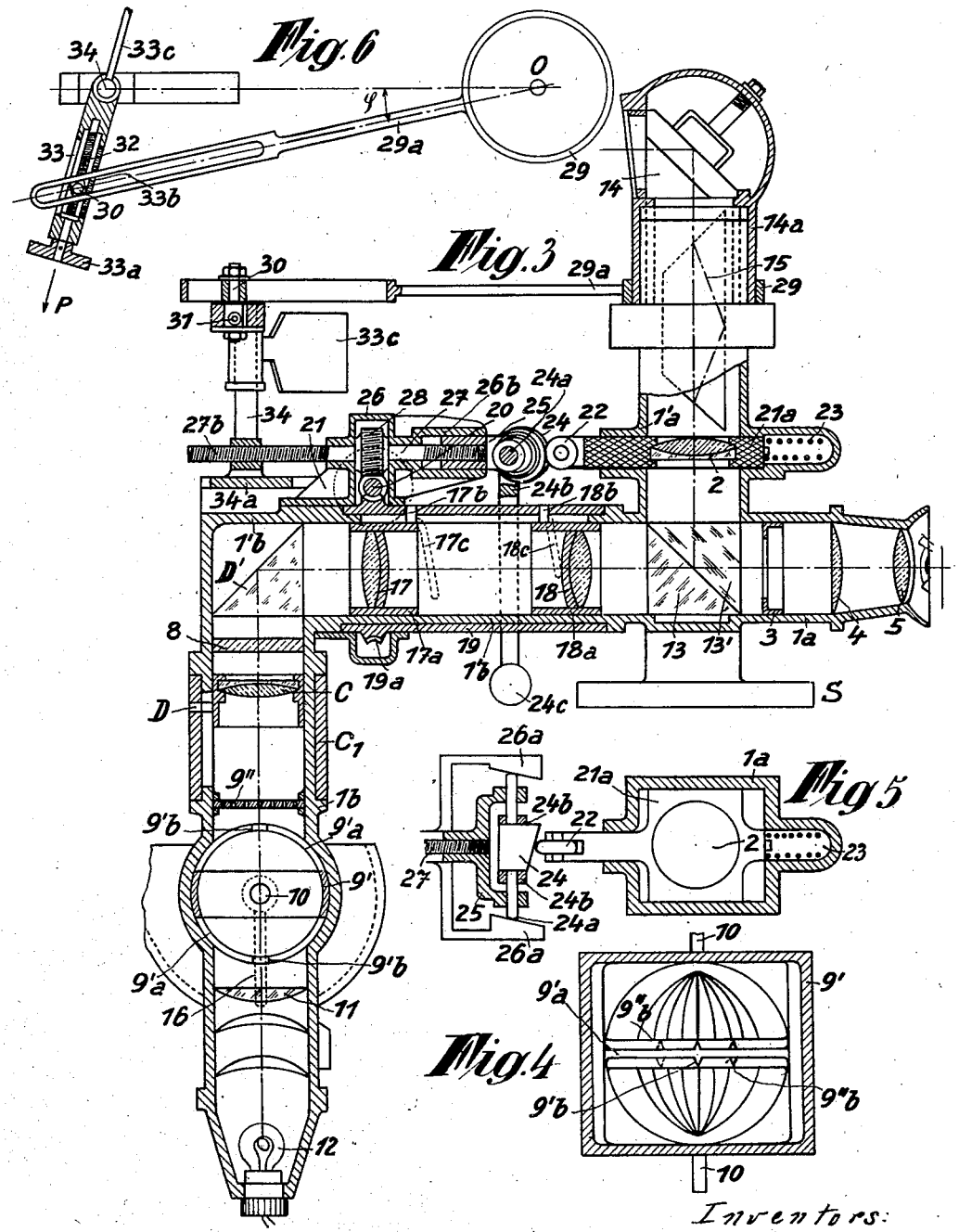

1,913,793

UNITED STATES PATENT OFFICE

ANTONIO CLEMENTI AND IGNAZ PECHAN, OF VIENNA, AUSTRIA, ASSIGNORS TO ACTIENGESELLSCHAFT C. P. GOERZ OPTISCHE ANSTALT ACTIOVA SPOLECNOST K. P. GOERZ OPTICKY USTAV, OF BRATISLAVA, CZECHOSLOVAKIA, A COMPANY OF CZECHOSLOVAKIA

AIMING TELESCOPE

Application filed June 11, 1932, Serial No. 616,726, and in Germany June 11, 1931.

Our invention relates to aiming telescopes permitting to estimate the angle of allowance in front of a moving target such for instance as aiming telescopes for antiaircraft ordnance or machine guns. An aiming telescope of this class is for instance described and claimed in the prior U. S. Patent No. 1,889,151, Nov. 29, 1932 (application Serial No. 523,887 filed March 19th, 1931). In this aiming telescope an opaque diaphragm is mounted rotatably around a horizontal axis in a telescope casing and is provided with one or more concentric transparent circular rings. This diaphragm is held at the proper inclination to the horizon depending on the inclination of the line of sight while a pencil of parallel rays of light is projected therethrough onto a frosted plate. The images of the said transparent circular ring or concentric rings of the diaphragm thus appear on the frosted plate as illuminated ellipses or concentric ellipses and are reflected by an inclined plane reflecting plate into the field of vision of the said aiming telescope.

The first object of our present invention is to so construct this projection apparatus that when using a single transparent circular ring in the said diaphragm as the speed scale, the great axis of the ellipse projected onto the said frosted plate may be so adjusted through the medium of a suitable scale that it is proportional to the measured or estimated speed of the target. With this object in view we interpose between the said diaphragm and the said frosted plate in the path of the pencil of parallel rays of light a collective lens adjustable in the direction of this pencil of light in accordance with the speed of the target. By the interposition of this collective lens the parallel rays of light are caused to converge towards the focus of the said collective lens, so that the great axis of the ellipse thus projected onto the frosted plate is proportional to the distance of the focus of the said collective lens from the said frosted plate.

A further object of our invention is to so construct the aiming telescope that the size of the ellipse serving as a sighting means may be adjusted in accordance with the distance of the target from the ordnance or gun. Another object of our present invention is to adjust the firing angle in accordance with the position of the target and with its distance from the ordnance or gun.

In order to enable the aiming telescope on an aircraft it is necessary to so construct the diaphragm provided with the transparent circular ring that not only targets above the level of the aiming telescope, but also targets in this level or even below the same may be properly aimed at and the influence of the average speed of the projectile is automatically eliminated, this average speed depending on the distance of the target from the aiming telescope and being required for taking into account the speed of the aiming telescope itself.

With these objects in view the aiming telescope is so constructed that by adjusting an element of the structure, for instance a screw spindle in accordance with the distance of the target the size of the ellipse above referred to and depending on this distance is adjusted by axially shifting a system of lenses, such for instance as a pancratian system, interposed in the path of the pencil of parallel rays of light going from the diaphragm to the frosted plate. This ellipse serves for determining the angle of allowance in front of the target. The adjustment in accordance with the distance of the target is also used for automatically making the adjustment for the firing angle which depends on the distance of the target and of the angle of position of the target the adjustment for the latter being automatically made by a suitable device. The adjustment for the firing angle is effected by shifting an optical element for instance by laterally shifting the objective of the telescope. When the present aiming telescope has to be used on board of aircrafts the influence of the movement of the latter is automatically eliminated as follows: By adjusting the said element of the structure in accordance with the distance of the target, the average speed of the projectile depending on this distance is adjusted on a selected scale as one side of a horizontal speed triangle, a second side of this triangle is parallel to the longitudinal axis of the aircraft and is automatically adjusted in accordance with the speed of the aircraft. The third side of this speed triangle is so directed by means of an entering mirror that the aiming line makes with the side of the triangle adjusted for the average speed of the projectile the angle of allowance in front of the moving target between the sighting line and the barrel of the fire arm.

In order that when the aiming telescope is used on board of an aircraft, targets may be aimed at which are on the same or on a lower level than the aircraft, the diaphragm is so constructed that there is provided in combination with a rotatably mounted diaphragm held by any suitable means in a predetermined position relatively to the horizon and provided with two diametrical sighting marks, a second stationary diaphragm equipped with a series of concentric transparent sighting ellipses having in common a transparent great axis. Of these ellipses the one indicated by the sighting marks of the rotatable diaphragm serves for determining the angle of allowance in front of the moving target.

The annexed drawings illustrate by way of example embodiments of our invention. Fig. 1 is a side elevation partly in section of one embodiment or our aiming telescope. Fig. 2 is a side elevation of the adjusting sleeve with the speed scale. Fig. 3 is a vertical section of the aiming telescope showing the complete optical equipment, Fig. 4 is an inverted plan view of the rotatable diaphragm with the ellipses of the stationary diaphragm. Fig. 5 is a plan view partly in section of the mechanism for laterally shifting the objective of the telescope for the adjustment for the firing angle, Fig. 6 is a plan view of the link and lever gearing of the speed triangle serving for eliminating the influence of the speed of the moving aiming telescope.

Referring to Figs. 1 and 2 the telescope casing is bent rectangularly and comprises the telescope, part 1a and the projection part 1b. In the telescope part are mounted the objective 2 of the telescope, the pointer mark plate 3, the collective lens 4 and the eye piece 5 and the inclined transparent and reflecting plate 6. In the projection part are mounted the projection objective 7, the frosted disc 8, the diaphragm 9 rotatable around the horizontal shaft 10 and provided with a transparent circular ring 9a the condensing set of lenses 11 and the incandescent lamp 12.

Below the frosted disc 8 a collecting lens C is mounted in a hollow cylindrical guide C2 with a fixed stud D projecting radially therefrom and passing through a vertical slot 1a in the tube 1b of the telescope casing. This stud also passes through an inclined slot in the sleeve C1 (see also Fig. 2) rotatably mounted on the tube 1b, but locked against axial movement thereon. At the upper edge of this sleeve is provided a scale which may be adjusted relatively to a pointer mark 7 on the tube 1b in accordance with the speed of the target by turning this sleeve, C1 on the tube 1b. As a result of this adjustment the lens moves axially, say from C to C' and its focus from F to F'. When the diaphragm is inclined to the optical axis of the projection part of the aiming telescope the bus C projects a luminous ellipse on the frosted disc, the great axis of the ellipse being determined by the position of the lens C and consequently by the distance of the target.

Referring now more particularly to Fig. 3 the objective 2 is mounted in a tube 1'a perpendicular to the telescope part 1a and two isosceles rectangular prisms 13, 13' cemented together at their hypothenuse surfaces so as to form a cube, are arranged at the meeting of the two tubes 1a, 1'a. The hypothenuse surface of the prism is provided with a reflecting coating, such as of silver, permeable to light to about 40%. The rays of light incoming from the target and reflected downwardly by the reflectin prism 14 rotatably mounted around a vertical axis, first pass through a rectifying prism 15 rotating around the same vertical axis with half the angular speed of the reflecting prism 14 and then through the objective 2 and finally about 60% of these rays are reflected at the hypothenuse surface of the prism 13 to the eye piece 5.

The construction of the projection part of the aiming telescope is substantially the same as above described, only for the plane diaphragm 9 a cylindrical one, 9' with two diametrically opposite pointer marks 9'b, 9'b on the ring 9'a is substituted and near this rotatable diaphragm a stationary diaphragm 9'' is arranged which is provided with a series of transparent ellipses having in common a transparent great axis, the small axes of these ellipses being, of course, different as shown in Fig. 4. Thus the said series of ellipses as also the pointer marks 9''b, 9''b are projected onto the frosted disc 8 by the lens C in a size depending on the distance of the target. Above the frosted disc 8 is arranged an isosceles rectangular reflecting prism D' which reflects the image received from the frosted disc 8 to the cube 13, 13' and further on into the field of vision. Between the prism D' the cube 13, 13' is interposed a pancratian set of lenses comprising the axially adjustable lenses 17, 18. For moving these lenses axially their frames 17a, 18a are provided with short radial studs 17b, 18b extending through an axial slot of the tube 1'b of the casing into the helical slots 17c, 18c of a sleeve 19 rotatable around the common optical axis of the lenses 17, 18, but locked against axial movement. The sleeve 19 is rotated by means of a worm wheel 19a fast thereon into which engages a worm 20 actuated by a handle disc 21 by which the adjustment is effected in accordance with a scale, not shown, indicating the distance of the target. Thus the pancratian set of lenses is shifted axially in the one or the other direction projecting an image of the ellipses and marks appearing on the frosted plate 8 onto the diaphragm 3 in the field of vision, the said image being magnified or reduced according to the distance of the target.

Moreover the adjustment of the worm 20 according to the scale of the distance of the target is also utilized for adjusting the firing angle depending on this distance as also of the value of the cosine of the angle of position of the target. For a given distance of the target and a horizontal aiming line in which case cos $\varphi=1$ this firing angle is a maximum, while when the aiming line is vertical and cos $\varphi=0$ the firing angle is zero. In order to enable this dependence of the firing angle on the angle of position to be taken into account, for instance the telescope objective 2 is made adjustable perpendicularly to the optical axis of this objective in such a manner that any such movement of the said objective brings about a corresponding vertical movement of the image of the target in the diaphragm of the field of vision. For this purpose the objective 2 is mounted in a slide 21a guided radially to the optical axis of the objective and carrying at one side a roller 22 rotatable around a horizontal axis, while at the other side it is under the action of a spring 23 forcing the roller 22 against the periphery of a cam 24. This cam is fast on a horizontal shaft 24a rotatable and axially movable in a fork 25, Fig. 5. The ends of this shaft are in permanent contact with parallel inclines 26a of a fork shaped extension of the guide 26b for the end of the fork 25 which guide is locked against rotation. Into the tapped bore of the fork 25 engages the screw threaded end of a shaft 27 rotatably mounted in the casing 26. On the shaft 27 is fast a worm wheel 28 into which engages the worm 20. The radii of the various transverse sections of the cam 24 are so calculated that to any displacement of the fork 25 which is automatically adjusted by the pendulum 24c secured to the shaft 24a by the forked rod 24b corresponds such a transverse displacement of the telescope objective 2 that the vertical displacement of the image of the target in the field of vision due thereto results in an inclination of the aiming line relatively to the axis of the barrel of the fire arm kept parallel to the optical axis of the eye piece that the required firing angle is obtained. Finally for eliminating the influence of the speed of the structure carrying the aiming telescope and of the average speed of the projectile depending on the distance of the target the lateral adjustment of the entering reflector is effected by the mechanism shown in Fig. 6 in plan view.

To the bottom edge of the casing 14a of the entering reflector is secured a ring 29 carrying a rod 29a provided with a slot into which engages a vertical stud 30 provided at its prismatic bottom end with a tapped bore 31. Into this tapped bore engages a screw spindle 32 rotatably mounted in a slotted rod 33 but locked against longitudinal movement. This screw spindle together with the rod 33 serve as a guide for the stud 30. The screw spindle 32 may be turned by a handle disc 33a and thus the stud 30 may be accurately adjusted relatively to the centre of the journal pin 34 in accordance with the speed of the structure carrying the aiming telescope, this speed being measured by a speed scale 33b. The journal pin 34 is provided at its bottom end with a slide 34a, Fig. 3, and a tapped bore. Into the latter engages the screw threaded end 27b of the shaft 27 of the worm wheel 28. Therefore by adjusting the worm 20 in accordance with a target distance scale the distance of the journal pin 34 from the centre 0 of the ring 29 is so adjusted that the distance 0, 34 represents the average speed of the projectile for the given distance of the target as measured on the scale 33b. The direction of the rod 33 representing the speed of the structure carrying the aiming telescope in the speed triangle 0, 30, 34 is obtained automatically by providing as an extension of this side outside the journal pin 34 a vane 33c by which the rod 33 is constantly kept in the direction of the speed of the structure as indicated by the arrow P. By this adjustment the entering reflector and thereby also the aiming line is always kept in the direction 0, 30, that is to say at an angle $\varphi$ relatively to the horizontal projection 0, 34 of the axis of the barrel of the firearm.

The operation of the present aiming telescope is as follows:

The aiming telescope is so mounted on the firearm by means of the base S that the barrel of the firearm is parallel to the optical axis of the eye piece. After estimating the speed of the target the lens C is adjusted relatively to the frosted plate 8 by turning the sleeve $C_1$ to an extent indicated by the speed scale at the upper edge of the said sleeve, as above described. Thereby a size of the sighting ellipse or ellipses corresponding to the speed of the target is obtained. After measuring or eliminating the distance of the target the worm 20 is adjusted in accordance with a speed scale. Thereby at the same time the pancratian system of lenses 17, 18 adjusts the size of the image of the ellipse or ellipses in the diaphragm 3 of the field of vision in accordance with the distance of the target while the displacement of the cam 24 automatically adjusts the firing angle taking into account the angle of position of the target for which the pendulum has been adjusted. Thereby the objective of the telescope is adjusted laterally and the marks of the rotary diaphragm indicate by their positions 9″b, 9‴b, Fig. 4, which of the ellipses have to be used for sighting. Finally by adjusting the worm in accordance with the distance of the target also the average speed of the projectile represented by the line 0, 34 is adjusted which in connection with the known and adjusted speed of the structure carrying the aiming telescope represented by the line 30, 34 gives the angle of allowance in front of the target.

What we claim is:

1. In an aiming telescope the combination of a telescope part including an eye piece, a projection part, perpendicular to the said telescope part and including a source of light, a projection system of lenses adapted to project a pencil of parallel rays of light from the said source of light in the direction of the optical axis of the said projection system of lenses, a shaft passing transversely through the said projection part and being perpendicular to the optical axis of the said eye piece and the said projection system of lenses, the said aiming telescope being as a whole rotatably mounted on the said shaft, an opaque diaphragm provided with transparent marks and rotatably mounted on the said shaft, a frosted plate in the said projection part and perpendicular to the optical axis of the said projection system of lenses the said source of light, projection system of lenses, diaphragm and frosted plate being mounted the one behind the other in the said projection part, an objective associated with the said eye piece and means for reflecting the rays of light coming from the said frosted plate into the direction of the optical axis of the said eye piece, with a collecting lens interposed between the said diaphragm and the said frosted plate, and means for adjusting the said collecting lens in the direction of the optical axis of the said projection system of lenses in accordance with the speed of the target.

2. In an aiming telescope the combination of a telescope part including an eye piece, a projection part, perpendicular to the said telescope part and including a source of light, a projection system of lenses adapted to project a pencil of parallel rays of light from the said source of light in the direction of the optical axis of the said projection system of lenses, a shaft passing transversely through the said projection part and being perpendicular to the optical axis of the said eye piece and the said projection system of lenses the said aiming telescope being as a whole rotatably mounted on the said shaft, an opaque diaphragm provided with transparent marks and rotatably mounted on the said shaft, a frosted plate in the said projection part and perpendicular to the optical axis of the said projection system of lenses the said source of light, projection system of lenses, diaphragm and frosted plate being mounted the one behind the other in the said projection part, an objective associated with the said eye piece and means for reflecting the rays of light coming from the said frosted plate into the direction of the optical axis of the said eye piece, with a collecting lens interposed between the said diaphragm and the said frosted plate, and means for adjusting the said collecting lens in the direction of the optical axis of the said projection system of lenses in accordance with the speed of the target, the last named means comprising a casing for the said projection part, a casing for the said collecting lens slidably mounted in the said casing for the projection part, an outer sleeve rotatably mounted but locked against axial movement on the said casing for the projection part, an oblique slot in the said sleeve, an axial slot in the said casing for the projection part and a radial stud on the said casing for the collecting lens the said stud passing through both of the said slots.

3. In an aiming telescope the combination of a telescope part including an eye piece, a projection part, perpendicular to the said telescope part and including a source of light, a projection system of lenses adapted to project a pencil of parallel rays of light from the said source of light in the direction of the optical axis of the said projection system of lenses, a shaft passing transversely through the said projection part and being perpendicular to the optical axis of the said eye piece and the said projection system of lenses, the said aiming telescope being as a whole rotatably mounted on the said shaft, an opaque diaphragm provided with transparent marks and rotatably mounted on the said shaft, a frosted plate in the said projection part and perpendicular to the optical axis of the said projection system of lenses the said source of light, projection system of lenses, diaphragm and frosted plate being mounted the one behind the other in the said projection part, an objective associated with the said eye piece and means for reflecting the rays of light coming from the said frosted plate into the direction of the optical axis of the said eye piece, with a collecting lens interposed between the said diaphragm and the said frosted plate, and means for adjusting the said collecting lens in the direction of the optical axis of the said projection system of lenses in accordance with the speed of the target, a diaphragm in the field of vision of the said telescope part, a set of lenses interposed between the said diaphragm in the field of vision of the said telescope part and the said frosted plate a structural element operatively connected to the last named set of lenses and means for adjusting the said structural element in accordance with the distance of the target from the aiming telescope whereby the last named set of lenses projects an image of the said frosted plate onto the said diaphragm in the field of vision of the telescope part the size of the said image corresponding to the distance of the target from the aiming telescope.

4. In an aiming telescope the combination of a telescope part including an eye piece, a projection part, perpendicular to the said telescope part and including a source of light, a projection system of lenses adapted to project a pencil of parallel rays of light from the said source of light in the direction of the optical axis of the said projection system of lenses, a shaft passing transversely through the said projection part and being perpendicular to the optical axis of the said eye piece and the said projection system of lenses the said aiming telescope being as a whole rotatably mounted on the said shaft, an opaque diaphragm provided with transparent marks and rotatably mounted on the said shaft, a frosted plate in the said projection part and perpendicular to the optical axis of the said projection system of lenses the said source of light, projection system of lenses, diaphragm and frosted plate being mounted the one behind the other in the said projection part, an objective associated with the said eye piece and means for reflecting the rays of light coming from the said frosted plate into the direction of the optical axis of the said eye piece, with a collecting lens interposed between the said diaphragm and the said frosted plate, and means for adjusting the said collecting lens in the direction of the optical axis of the said projection system of lenses in accordance with the speed of the target, means for laterally displacing the objective of the said telescope part and comprising a structural element, and means for adjusting the said structural element in accordance with the distance of the target from the aiming telescope and furthermore comprising means for adjusting the said objective of the telescope part in accordance with the angle of position of the target whereby the aiming line is inclined to the optical axis of the eye piece.

5. In an aiming telescope the combination of a telescope part including an eye piece, a projection part perpendicular to the said telescope part and including a source of light, a projection system of lenses adapted to project a pencil of parallel rays of light from the said source of light in the direction of the optical axis of the said projection system of lenses, a shaft passing transversely through the said projection part and being perpendicular to the optical axis of the said eye piece and the said projection system of lenses, the said aiming telescope being as a whole rotatably mounted on the said shaft, an opaque diaphragm provided with transparent marks and rotatably mounted on the said shaft, a frosted plate in the said projection part and perpendicular to the optical axis of the said projection system of lenses the said source of light, projection system of lenses, diaphragm and frosted plate being mounted the one behind the other in the said projection part, an objective associated with the said eye piece and means for reflecting the rays of light coming from the said frosted plate into the direction of the optical axis of the said eye piece, with a collecting lens interposed between the said diaphragm and the said frosted plate, and means for adjusting the said collecting lens in the direction of the optical axis of the said projection system of lenses in accordance with the speed of the target, an entering reflector rotatably mounted on the said telescope part casing parallel to the said projection part for the said entering reflector, a slotted rod fast on and radial to the said casing of the entering reflector, a journal pin, means comprising a structural element for adjusting the said journal pin radially to the said casing of the entering reflector in accordance with the average speed of the projectile, a second rod rotatably mounted on the said journal pin, a pivot pin connecting the said second rod with the said slotted rod, means for permanently holding the said second rod in the direction of movement of the structure carrying the aiming telescope and means for adjusting the distance between the said journal pin and pivot pin in accordance with the speed of the structure carrying the aiming telescope whereby the entering reflector is turned around a vertical axis relatively to the optical axis of the eye piece through an angle representing the angle of allowance in front of the target.

6. In an aiming telescope the combination of a telescope part including an eye piece, a projection part perpendicular to the said telescope part and including a source of light, a projection system of lenses adapted to project a pencil of parallel rays of light from the said source of light in the direction of the optical axis of the said projection system of lenses, a shaft passing transversely through the said projection part and being perpendicular to the optical axis of the said eye piece and the said projection system of lenses, the said aiming telescope being as a whole rotatably mounted on the said shaft, an opaque diaphragm provided with transparent marks and rotatably mounted on the said shaft, a frosted plate in the said projection part and perpendicular to the optical axis of the said projection system of lenses the said source of light, projection system of lenses, diaphragm and frosted plate being mounted the one behind the other in the said projection part, an objective associated with the said eye piece and means for reflecting the rays of light coming from the said frosted plate into the direction of the optical axis of the said eye piece, with a collecting lens interposed between the said diaphragm and the said frosted plate, and means for adjusting the said collecting lens in the direction of the optical axis of the said projection system of lenses in accordance with the speed of the target, and further in connection with a second diaphragm interposed between the first named diaphragm and the said collecting lens, the first named diaphragm being provided with diametrical transparent marks and the second diaphragm being provided with a series of transparent ellipses having a common transparent great axis and different small axes.

In testimony whereof we affix our signatures.

ANTONIO CLEMENTI.
IGNAZ PECHAN.